May 25, 1965 W. A. FISH, JR., ETAL 3,185,180
FLUID-CONTROL VALVE WITH AUTOMATIC FLUID LATCHING
Filed July 18, 1963 4 Sheets-Sheet 1

INVENTORS
William A. Fish, Jr. and
Charles B. Wolf
BY
Willard R. Croust
ATTORNEY WITNESSES:
John G. Chopp
James F. Young

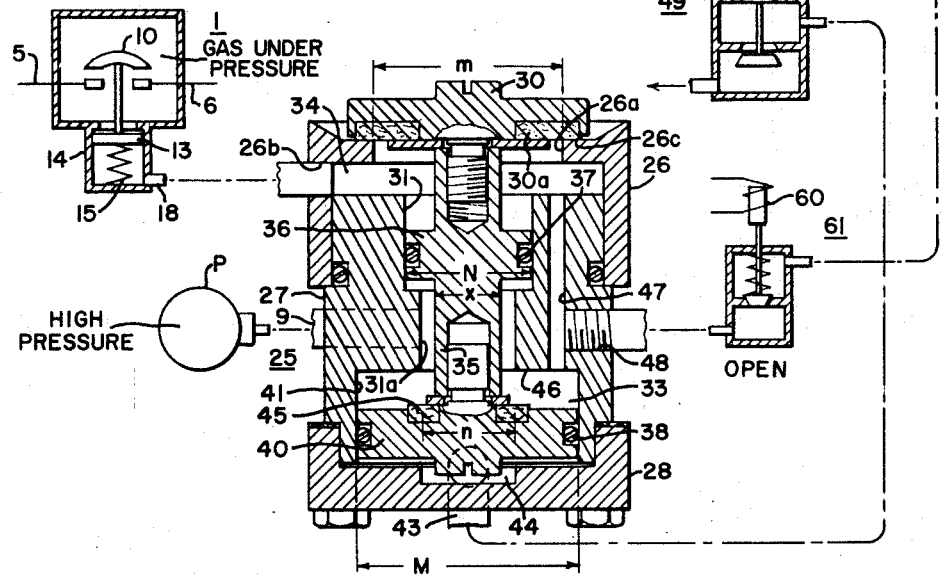
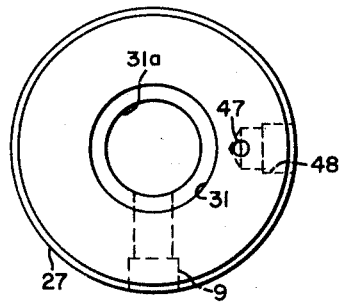
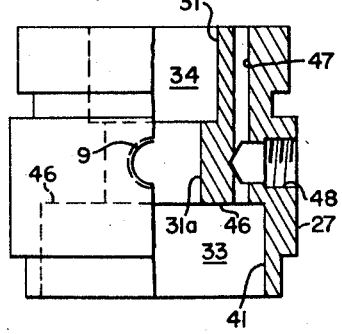
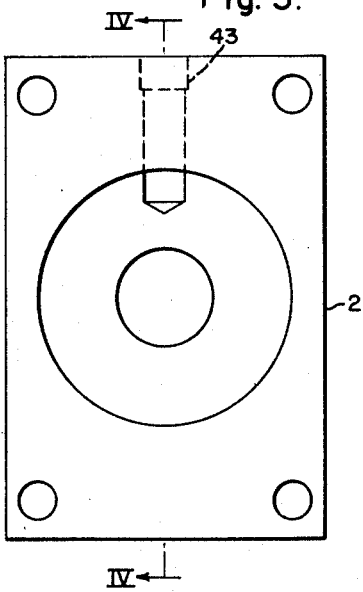
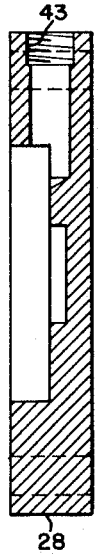

United States Patent Office 3,185,180
Patented May 25, 1965

3,185,180
FLUID-CONTROL VALVE WITH AUTOMATIC FLUID LATCHING
William A. Fish, Jr., Wilkins Township, Allegheny County, and Charles B. Wolf, North Huntingdon Township, Westmoreland County, Pa., assignors to Westinghouse Electric Corporation, Pittsburgh, Pa., a corporation of Pennsylvania
Filed July 18, 1963, Ser. No. 296,015
2 Claims. (Cl. 137—625.66)

This invention relates to fluid-control valves in general and, more particularly, to an improved fluid-control valve having an automatic latching feature.

A general object of the present invention is the provision of an improved fluid-control valve for effecting the pressurizing, or exhausting of the operating cylinder of a fluid motor of any desired type.

Another object of the present invention is the provision of an improved pneumatic fluid-control valve particularly applicable for compressed-gas circuit interrupters.

Still a further object of the present invention is the provision of an improved fluid-control valve for circuit interrupters having hydraulic operating mechanisms.

Still a further object of the present invention is the provision of an improved fluid-control valve for effecting rapid and efficient operation of a closing switch, the latter having particular applicability to high-power laboratory closing circuits for testing circuit breakers.

The improved fluid-control valve of the present invention has the desirable feature of providing automatic fluid latching, that is maintaining its pressurized or exhausting condition by the utilization of suitable fluid forces resulting from the particular construction of the valve. This is particularly desirable in the case of circuit-breaker application, inasmuch as no mechanical latches need be provided. In addition, electrical interlocks are avoided and the resulting arrangement is exceedingly simple and consequently maintenance-free.

The improved fluid-control valve of the present invention having the characteristics of automatic fluid latching is adaptable for wide use in various applications. Only a few applications are illustrated in the present application; however, it is to be clearly understood that other applications will readily suggest themselves to those skilled in the art upon understanding the principles of operation of the fluid-control valve of the present invention.

Further objects and advantages will readily become apparent upon reading the following specification, taken in conjunction with the drawings, in which:

FIG. 2 is a vertical sectional view taken through the improved fluid-control valve of the present invention, the valve being shown in its energized or pressurized condition;

FIG. 3 illustrates in side elevation the lower cover for the fluid-control valve of the present invention;

FIG. 4 is a vertical sectional view taken substantially along the line IV—IV of FIG. 3;

FIG. 5 is a quarter-sectional view taken through the valve body of the improved fluid-control valve of FIG. 2;

FIG. 6 is an end elevational view of the valve body;

Figure 1:
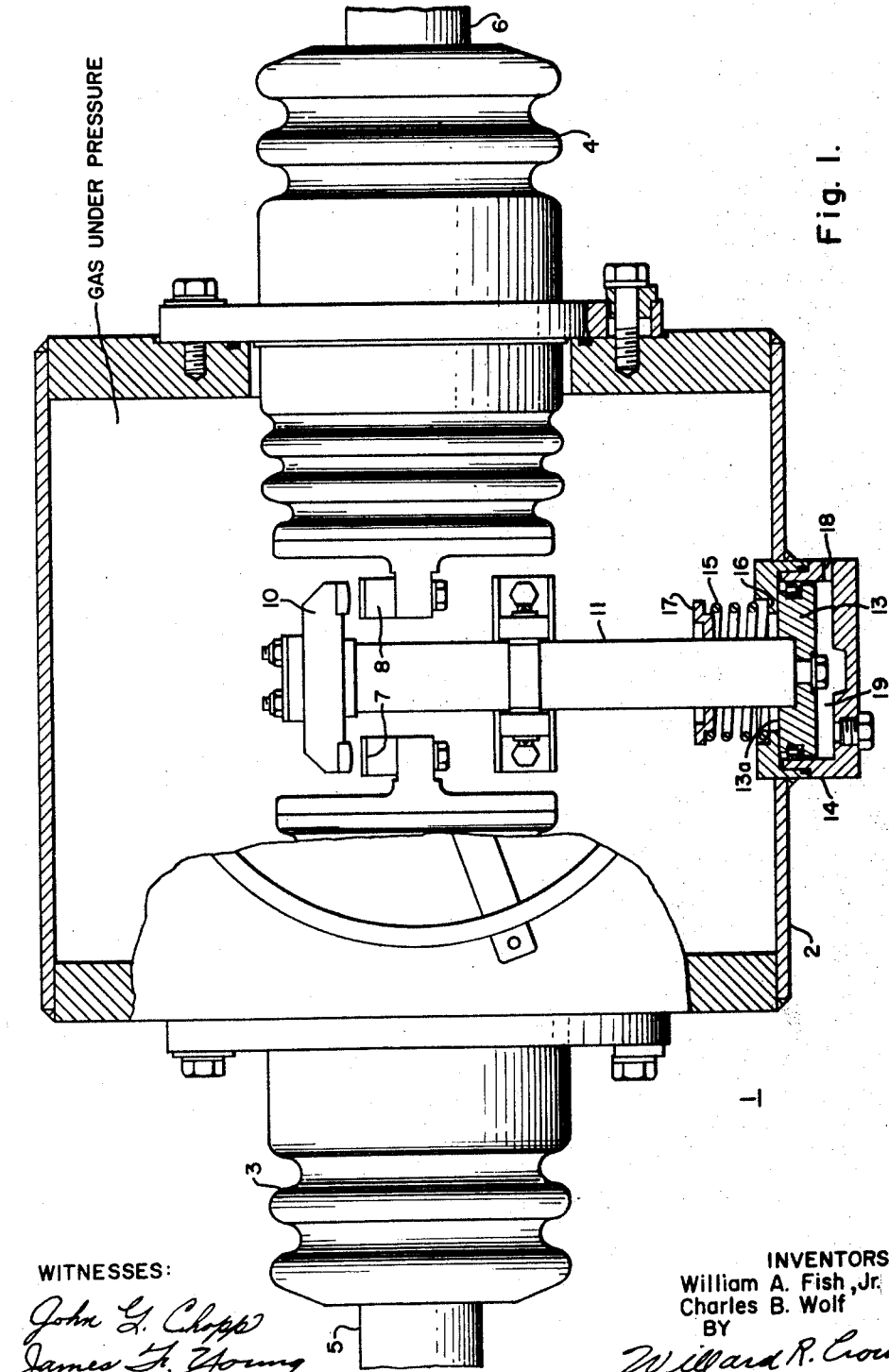
FIGURE 1 is a side elevational view, partially in vertical section, of an improved compressed-air closing switch, the contacts being illustrated in the open-circuit position.
Figure 7:
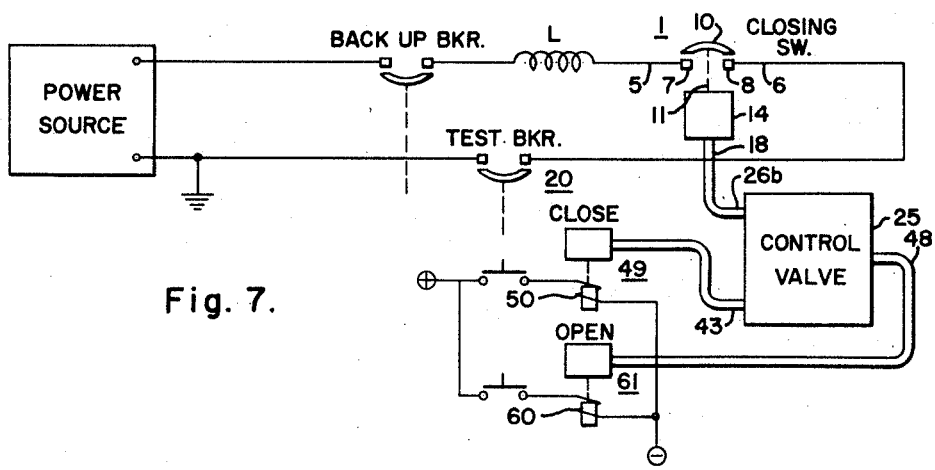
FIG. 7 illustrates a line diagram of a test circuit and associated component test parts applicable for utilizing the improved fluid-flow control valve of the present invention as applied to a high-power laboratory closing switch for testing a circuit breaker.

Referring to the drawings, and more particularly to FIG. 1 thereof, the reference numeral 1 generally designates a closing switch generally used in laboratory testing arrangements for testing circuit breakers, such as shown in FIG. 7 of the drawings. Generally, the closing switch 1 comprises a housing 2 which is preferably pressurized with a gas pressure of say, for example, 150 pounds per square inch. Extending into opposite ends of the pressurized housing 2 is a pair of terminal bushings 3, 4 enclosing terminal studs 5, 6, the latter terminating interiorly of the housing structure 2 as a pair of stationary contacts 7, 8. As shown, the relatively stationary contacts 7, 8 are conductively bridged by a conducting bridging contact 10 controlled by an operating rod 11 preferably formed of insulating material and fixedly attached to an operating piston 13 reciprocally operable within an operating cylinder 14.

An accelerating opening compression spring 15 tends to bias the bridging contact 10 to the open position. As shown, the opening spring 15 is interposed between a shoulder portion 16 of the operating cylinder 14 and a spring seat 17 fixedly secured to and movable with the insulating operating rod 11.

It will be obvious that with the arrangement shown, the admittance of pressure to the inlet port 18 of the operating cylinder 14 will force the bridging contact 10 to its open position, as shown in FIG. 1. On the other hand, the exhausting of pressure from the region 19 below the operating piston 13 will permit the pressurized gas, at say the 150 p.s.i.g. pressure level, to act downwardly on the top surface 13a to quickly effect closing of the closing switch 1. It will, therefore, be apparent that it is very desirable to effect a rapid exhausting of pressure within the region 19 below the operating piston 13 to quickly effect closing movement of the closing switch 1 and consequent forcing of current through the test breaker 20 (FIG. 7).

To effect the pressurized and exhausting condition of the space 19 below the operating piston 13 of the closing switch 1, preferably the improved fluid-control valve 25 of the present invention is employed, as more fully illustrated in FIGS. 2–6 of the drawings. With reference to FIG. 2 of the drawings, it will be noted that generally, the fluid-control valve 25 comprises a valve cap 26, a valve body 27 and a lower valve cover 28. The valve cap 26 has an exhausting aperture 26a provided therethrough, which is controlled by the operation of an exhaust valve 30 more fully described hereinafter.

FIGS. 5 and 6 more clearly show the constructional features of the valve body 27. It will be noted that there is provided an axial bore 31 having a restricting portion 31a. Additionally, there is provided a first enlarged space 33 and a second enlarged space 34 communicating with the exhaust aperture 26a and with the motor control port 26b, the latter communicating with the inlet port 18 of the operating cylinder 14 for the closing switch 1 of FIG. 1.

Reciprocally movable interiorly of the valve body 27 is a piston-actuated exhaust valve 30 having as a unitary portion thereof a valve stem 35 having an intermediate portion 36. As shown, O-rings 37, 38 are provided to prevent fluid escape.

Carried with the exhaust valve 30 is a sealing gasket 30a which seals against the sealing portion 26c of the valve cap 26 in the pressurized condition of the control valve 25, as shown in FIG. 2 of the drawings.

Fixedly secured to the lower end of the valve stem 35 is an actuating piston 40 operable within an operating cylinder 41 defined by the aforesaid first enlarged space 33.

A control pressure connection 43 enters the space 44 below the actuating piston 40. The pressure condition within the restricted portion 31a of the axial bore 31 is constantly maintained by a permanent pressure connection 9.

Figure 2A:
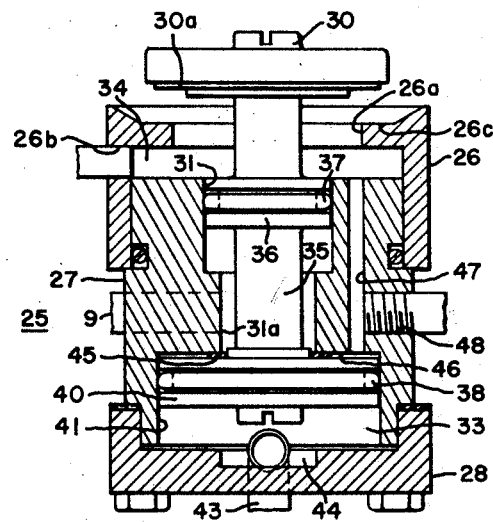
FIG. 2A is a view similar to FIG. 2, but showing the control valve in the "exhausting" position.

Carried with the valve stem 35 is a sealing gasket 45 which seals against the sealing portion 46 of the restricted opening 31a in the exhausted condition of the control valve 25, as shown in FIG. 2A of the drawings. A bypassing channel 47 of relatively small bore is provided, which parallels the axial bore 31 and has an inlet port 48 associated therewith. A three-way closing valve 49 is associated with the inlet port 43 leading to the space 44 below the actuating piston 40.

To effect closing of the control switch 1, the coil 50 of the closing pilot valve 49 is energized. This momentarily transmits high pressure into the space 44 below the actuating piston 40 forcing the latter upwardly to open the exhausting valve 30 and sealing the sealing gasket 45 against the valve seat 46. Since the volume of the space 44 is relatively small and the actuating area of piston 40 is large, only a very small build-up of pressure is required to start the exhausting operation. Only a momentary application of pressure from the closing switch 49 is required. Inasmuch as the area "N" exposed to the constant high pressure within the axial bore 31 is greater than the area "n" of the sealing gasket 45 exposed to the same pressure in the exhausted condition as shown in FIG. 2A, pneumatic latching is thereby achieved in the exhausted condition of the control valve 25.

To effect an opening operation of the closing switch 1 of FIG. 1, energization is obtained of the coil 60 associated with the pilot valve 61 to thereby effect a momentary pressurized condition through the inlet port 48 and into the bypassing channel 47. Since the restricted portion of the bypassing channel 47 is of only small dimensions, the exhausting of the pressure is less than the entrance of the pressure into the space 33 above the actuating piston 40 so that the piston 40 is forced downwardly to the position illustrated in FIG. 2 of the drawings, thereby closing the exhaust valve 30, sealing the gasket 30a against the valve seat 26c, and permitting high pressure to feed into the operating cylinder 14 of the closing switch 1 through bypassing channel 47 from the high-pressure gas tank P. Inasmuch as the area "M" exposed to the operating pressure is greater than the area "m" exposed to the same pressure the valve 25 will remain in the position shown in FIG. 2. Thus, pneumatic latching is achieved in the pressurized condition of the control valve 25. The closing switch 1 will thereby be opened as a result of the action of the compression spring 15 since the pressures are equalized on both sides of the piston 13.

The control valve 25 of the present invention has the particular advantage of remaining in its pressurized or exhausted condition without any mechanical latches due to the pressurized condition of the axial bore 31 and the particular arrangement of the component parts. The result is extremely high-speed closing operation of the closing switch 1, which is very important for consistent closing time required of laboratory test equipment. In addition, the control valve 25 is very simple and economical to manufacture. Moreover, there is provided a pneumatic latching, thus eliminating the need for delicate and troublesome adjustments of mechanical latches. Pneumatic "seal-in" on the "cylinder pressurizing" operation is obtained since momentary application of pressure from the pilot valve 61 will cause the device to complete its operation and "seal-in" with the cylinder 14 remaining pressurized. This eliminates the need for "seal-in" contacts in the electrical control circuit.

A very important feature of the invention, particularly when applied to circuit-breaker operation, is the pneumatic trip-free operation, since pressure from the "cylinder exhausting" pilot valve 49 will drive the exhaust valve 30 open and exhaust the operating cylinder 14 regardless of the condition of the "cylinder pressurizing" pilot valve 61. This eliminates the need for mechanical trip-free linkages to assure circuit-breaker tripping even though the closing coil is energized. More specifically, with the exhaust valve 30 closed, as shown in FIG. 2, and with both pilot valves 49, 61 energized, there will be an upward unbalanced opening force tending to unseat valve 30a equal to the pressure in space 34 times the entire opening area of exhaust outlet 26a. Once the exhaust valve 30 has opened the exhaust opening 26a slightly, the pressure will drop in the space 34. Now the forces acting on the intermediate portion 36 will be unbalanced, since high pressure exists below piston 36 and the pressure is dropping above piston 36 in the space 34. In addition, at this time, there is an additional upward exhausting force equal to the stem area X times the high pressure below the actuating piston 40 in the volume 44, and, moreover, to supplement this force there will be the differential force on the exhaust valve 30 itself, this force, however, dropping as the valve 30 moves to its upper end exhausting position.

Figure 8:
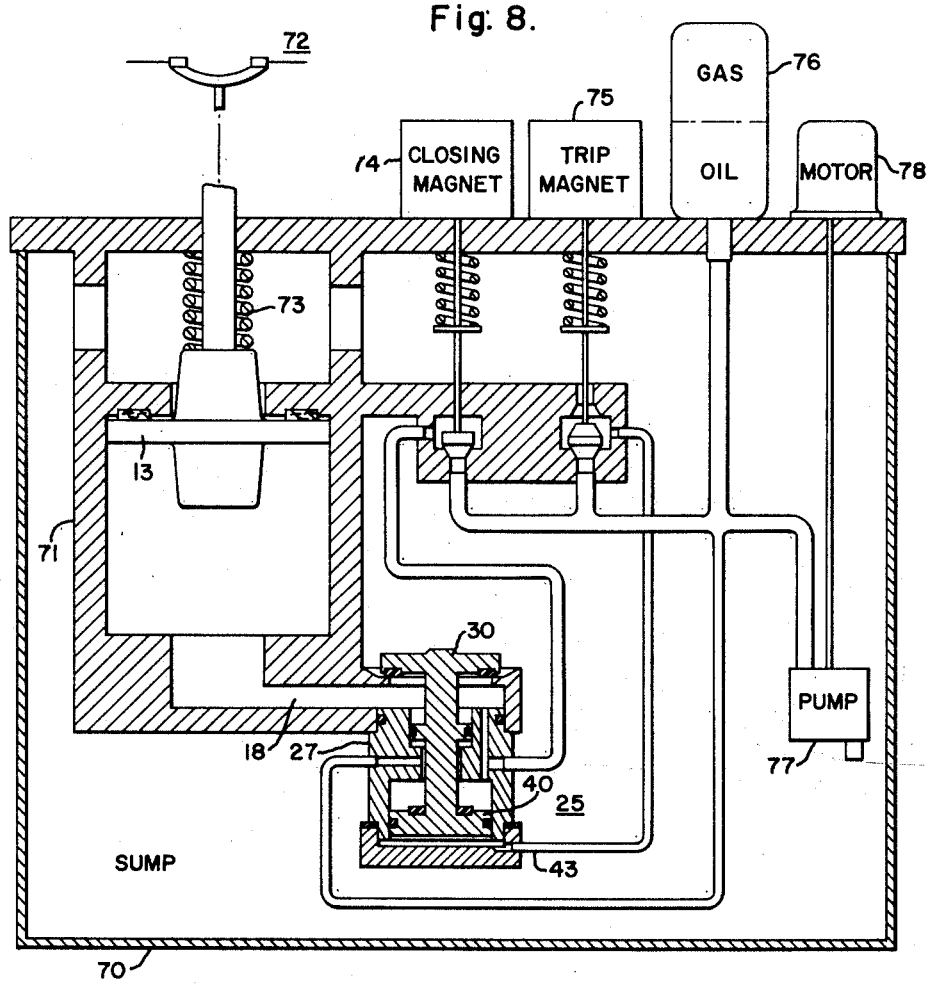
FIG. 8 illustrates an application of the improved fluid-control valve of the present invention as applied to a circuit breaker having a hydraulic operating mechanism; and, FIG. 9 is a compressed-gas circuit interrupter utilizing the control valve of the present invention, the contacts being shown in the closed-circuit position.

The improved fluid-control valve 25 of the present application has wide application. FIG. 8 shows the application of the fluid-control valve 25 as applied to hydraulic operation. It will be noted that there is provided a sump 70 containing oil at relatively low or atmospheric pressure. An operating cylinder 71 is provided to effect closing movement of the circuit breaker 72, and an accelerating opening spring 73 is provided to effect opening thereof upon the exhausted condition of the control valve 25. A closing pilot valve 74 and a tripping pilot valve 75 are provided having the connections as shown in FIG. 8. As shown, an accumulator 76 supplied with pressurized oil from an oil pump 77 is provided. To effect pump action, preferably a motor 78 is additionally provided.

All of the advantageous features hereinbefore listed are applicable to the hydraulic operating arrangement, as set forth in FIG. 8 of the drawings. A very important feature is the fact that the opening of the breaker 72 will take place in precedence to the closing of the breaker 72 by the particular control valve construction 25.

Figure 9:
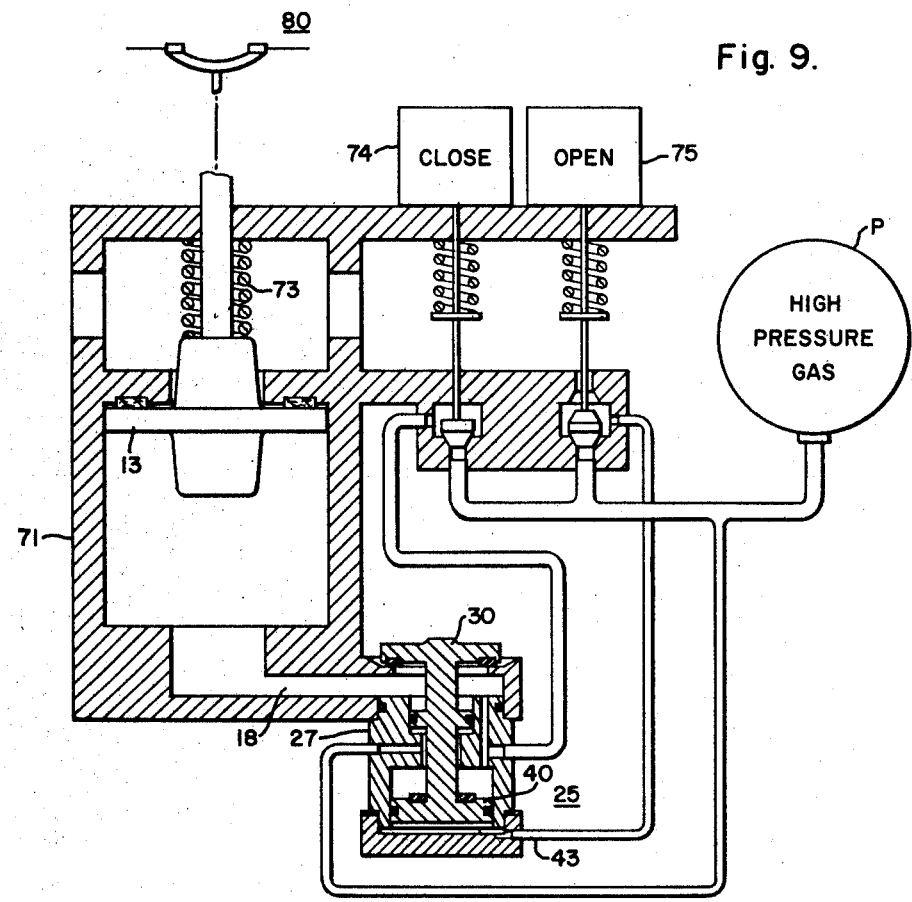

FIG. 9 illustrates an application of the control valve 25 of the present invention to a compressed-gas circuit interrupter 80 in which, as shown, the pressure connections are very similar to those set forth in connection with the hydraulic operating arrangement of FIG. 9; consequently, a further description thereof appears to be unnecessary.

From the foregoing description it will be apparent that there is provided an improved fluid-flow control valve 25 which is susceptible to wide application and has many advantages including those of fast operation, and trip-free operation. The constructional arrangement as employed is simple and economical to manufacture, and there is an elimination of complications with respect to the electrical control circuits.

Although there has been illustrated and described specific structures, it is to be clearly understood that the same were merely for the purpose of illustration, and that changes and modifications may readily be made by those skilled in the art without departing from the spirit and scope of the invention.

We claim as our invention:

1. A fluid-control valve for pressurizing or exhausting the operating cylinder of a fluid motor comprising, in combination, a valve body having an axial bore with a restricting portion therein, a piston-actuated exhaust valve having a valve stem portion extending through said axial bore, said valve body bore having a first enlarged space defining an operating cylinder on one side of said restricting portion and a second enlarged space on the other side of said restricting portion, said valve body having a motor control port connected with said second enlarged space, high-pressure fluid supply means for constantly supplying high-pressure fluid to said axial bore, an actuating piston disposed at one end of said valve-stem portion and reciprocally operable within the first-mentioned enlarged space, a gasket seal carried by said valve stem and arranged for sealing against said restricting portion in the exhaust position of the fluid-control valve, an intermediate piston portion secured to the valve stem and disposed on said other side of the restricting portion, the annular piston area of said intermediate piston portion being larger than the annular area of the gasket seal exposed to the constant high-pressure fluid when in the exhausting position of the control valve, a bypassing channel paralleling said axial bore and interconnecting the two enlarged spaces, and the annular area of the exhaust valve exposed to fluid pressure being less than the exposed annular area of the actuating piston when in the pressurized condition of the control valve.

2. A fluid-control valve for pressurizing or exhausting the operating cylinder of a fluid motor comprising, in combination, a valve body having an axial bore with a restricting portion therein, a piston-actuated exhaust valve having a valve stem portion extending through said axial bore, said valve body bore having a first enlarged space defining an operating cylinder on one side of said restricting portion and a second enlarged space on the other side of said restricting portion, said valve body having a motor control port connected with said second enlarged space, high-pressure fluid supply means for constantly supplying high-pressure fluid to said axial bore, an actuating piston disposed at one end of said valve-stem portion and reciprocally operable within the first-mentioned enlarged space, a gasket seal carried by said valve stem and arranged for sealing against said restricting portion in the exhaust position of the fluid-control valve, an intermediate piston portion secured to the valve stem and disposed on said other side of the restricting portion, the annular piston area of said intermediate piston portion being larger than the annular area of the gasket seal exposed to the constant high-pressure fluid when in the exhausting position of the control valve, a bypassing channel paralleling said axial bore and interconnecting the two enlarged spaces, and the annular area of the exhaust valve exposed to fluid pressure being less than the exposed annular area of the actuating piston when in the pressurized condition of the control valve, a control port connected to the second-mentioned enlarged space under the exhaust valve, an exhaust-valve closing connection leading to said bypassing channel, and an exhaust-valve opening connection leading to the first-mentioned enlarged space on the outer side of the actuating piston.

References Cited by the Examiner
UNITED STATES PATENTS 1,623,557  4/27  Rybeck _____ 137—625.27
3,104,133  9/63  Valentine _____ 137—102 XR MARTIN P. SCHWADRON, *Primary Examiner.*